United States Patent
Pétro et al.

[11] 3,895,443
[45] July 22, 1975

[54] METHOD OF MAKING A FALSE TOOTH

[76] Inventors: Claude Pétro, 3 rue de Alper, Geneva, Switzerland; André Glise, Le Coin, Collonges-sous-Saleve, France

[22] Filed: Nov. 20, 1972

[21] Appl. No.: 307,944

[52] U.S. Cl. .................................................. 32/8
[51] Int. Cl. ............................................ A61c 13/00
[58] Field of Search ............... 32/8, 2, 12, 13, 10 A

[56] References Cited
UNITED STATES PATENTS

| 448,745 | 3/1891 | Wright | 32/10 A |
| 1,307,299 | 6/1919 | Laing | 259/54 |
| 2,477,268 | 7/1949 | Saffir | 32/8 |
| 2,655,724 | 10/1953 | Brooks | 32/13 |
| 3,222,738 | 12/1965 | Carter | 164/34 |
| 3,572,421 | 3/1971 | Mezey | 164/34 |

*Primary Examiner*—Robert Peshock
*Assistant Examiner*—J. Q. Lever
*Attorney, Agent, or Firm*—Young & Thompson

[57] ABSTRACT

In the manufacture of core-like supports for false teeth, use is made of a set of prefabricated pieces each moulded in a calcinable plastic material and each having a shape and size corresponding to the desired shape and size of a core-like support for a given tooth.

1 Claim, 4 Drawing Figures

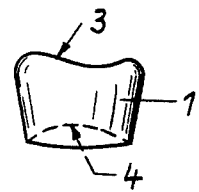
Fig. 1
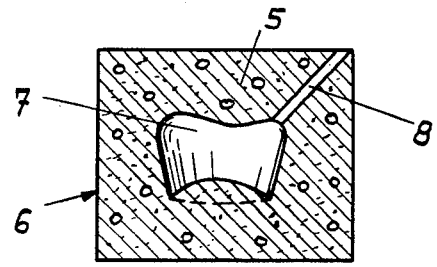
Fig. 2
Fig. 3
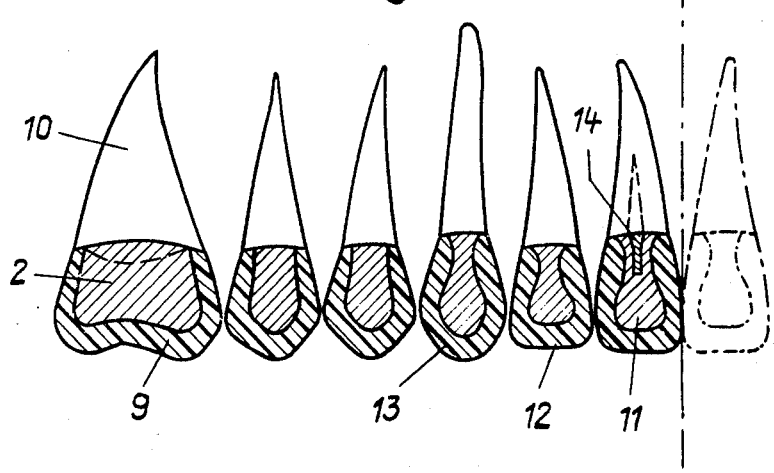
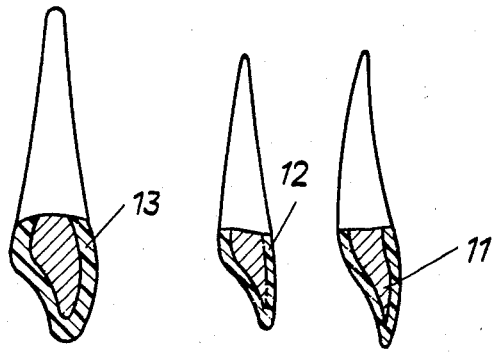
Fig. 4

METHOD OF MAKING A FALSE TOOTH

The invention relates to the manufacture of false teeth, and is particularly concerned with the manufacture of false teeth in which each tooth has a core-like support about which the tooth proper is moulded, the support corresponding substantially in shape to the outer part of the tooth, but being of smaller size.

In order to manufacture such a support, the normal procedure is to employ a piece of wax which is hand shaped to the desired form of the support, and the support is then moulded in a mould made using the piece of wax, after which the tooth is moulded about the support. The hand shaping of pieces of wax is not only time-consuming, but is a delicate operation and must be carried out by skilled dental technicians.

An aim of the invention is to simplify the above procedure by obviating the need for hand shaping of pieces of wax or other malleable materials to the desired forms of supports.

According to the invention, there is provided a set of pieces for use in the manufacture of core-like supports for false teeth, said pieces being prefabricated and each having a shape and size corresponding to the desired shape and size of a core-like support for a given type of false tooth.

The pieces are preferably prefabricated in a non-malleable material, or a material which can be deformed by the application of a relatively large pressure but which remains at least substantially non-malleable when handled. Advantageously, the pieces are prefabricated by moulding a mouldable calcinable material.

The invention will now be particularly described, by way of example, with reference to the accompanying drawings, in which:

FIG. 1 is an elevational view of one of a set of pieces according to the invention;

FIG. 2 is a cross-section through a mould formed using the piece of FIG. 1;

FIG. 3 shows, partly in cross-section, several false teeth of an upper jaw;

FIG. 4 is a side view, partly in cross-section, of several of the false teeth of FIG. 3.

The set of pieces according to the invention serve for the manufacture of core-like supports for false teeth. To avoid undue complication of the description, only a single prefabricated piece 1 of a set of pieces is shown in FIG. 1; this piece 1 is intended for use in manufacturing a support 2 in gold for the sixth tooth, or molar, of an upper jaw, shown in FIG. 3.

Prefabricated pieces 1 are mass produced by a known injection moulding process, using a mouldable calcinable material, for example a calcinable synthetic plastics material. The shape and size of piece 1 corresponds to the desired shape and size of the support 2, which is determined as a function of the shape and size of the molar tooth for which the support is adapted, i.e. the piece 1 has a socket-like part 3 corresponding to the crown or cap of the tooth and a side wall which tapers to a narrower end including a concave hollowed base portion 4. The outer surface of part 1 is either smooth, as shown, or may be provided with gripping asperities, for example striations.

When a dental technician has to make a false tooth, he firstly selects the appropriate prefabricated piece from the set of prefabricated pieces, for example the piece 1, and this piece is then used to provide a mould, FIG. 2, for moulding of the support 2. For this purpose, the prefabricated piece 1 is embedded, for example in plaster 5 in a schematically indicated coffering 6. Although the coffering has a rectangular cross-section as shown, it can have any suitable external shape, such as cylindrical. The coffering 6, plaster 5 and prefabricated piece 1, together with a rod of calcinable plastics material (not shown) joining the piece 1 to the edge of the coffering 6, are then placed in an oven and heated to a temperature to calcinate the material of piece 1 and the rod. A hollow housing 7 of shape and size corresponding to the prefabricated piece 1 is thus provided in the hardened plaster 5. A conduit 8 for the inflow of molten material into housing 7 is provided at the location previously occupied by the rod of calcinable material.

Molten gold is then poured into the cavity 7 to form a support 2 of gold, this support forming a core of a moulded molar tooth 9. The molar tooth 9 with its integral core-like support 2 is fixed on a root 10 in a known manner by any appropriate means such as a pivot or collarette (flange).

The shape of the core-like supports for the false teeth is identical to that of the corresponding prefabricated pieces according to the invention. The supports for the teeth of a part of the upper jaw shown in FIG. 3 thus correspond in shape and size to pieces of the set.

The first incisors includes a support 11 fixed on a pivot 14 of the root. In side cross-sectional view, the support 11 has the shape shown in FIG. 4. FIG. 4 also shows the second incisors 13 and the canine tooth 14, and their respective supports, in side cross-sectional view.

A complete set of pieces according to the invention could be made up solely of pieces which are solid throughout, as is the described piece 1 having a concave hollowed base portion, or solely of pieces which each have a hollow inner enclosure. A complete set could alternatively include one or several types of solid pieces, and one or several types of pieces each having a hollow inner enclosure. Also, at least some of the pieces of a set could be generally shell shaped, i.e. arcuate in longitudinal and transverse cross-section, whilst others could be tubular or hollow. Obviously, a set of pieces will preferably include pieces for the manufacture of corresponding supports for each type of tooth in the upper and lower jaw. Each type of piece will preferably be provided in several dimensions according to the normal range of sizes of the teeth.

What is claimed is:

1. A method of making a false tooth, comprising selecting from among a prefabricated set of different pieces of calcinable synthetic plastic material a piece having the general shape of but smaller than the false tooth to be produced, embedding the selected piece in plaster with a calcinable riser in the plaster, calcining the embedded piece and riser, casting gold into the cavity thus produced in the plaster, thereby to produce a gold core for the false tooth, and then molding the false tooth proper about the gold core.

* * * * *